(12) United States Patent
Porter et al.

(10) Patent No.: US 9,967,398 B2
(45) Date of Patent: May 8, 2018

(54) PROCESSING CALL CENTER DATA

(75) Inventors: John Porter, Morgan, UT (US); Bill Wiser, Hooper, UT (US); Ben Johnson, Syracuse, UT (US)

(73) Assignee: ClearView Business Intelligence, LLC, Roy, UT (US)

( * ) Notice: Subject to any disclaimer, the term of this patent is extended or adjusted under 35 U.S.C. 154(b) by 366 days.

(21) Appl. No.: 14/425,559

(22) PCT Filed: Sep. 4, 2012

(86) PCT No.: PCT/US2012/053649
§ 371 (c)(1),
(2), (4) Date: Oct. 28, 2015

(87) PCT Pub. No.: WO2014/039027
PCT Pub. Date: Mar. 13, 2014

(65) Prior Publication Data
US 2016/0044170 A1    Feb. 11, 2016

(51) Int. Cl.
*H04M 3/51* (2006.01)
*G06Q 30/00* (2012.01)
*H04M 3/22* (2006.01)

(52) U.S. Cl.
CPC ........ *H04M 3/5175* (2013.01); *G06Q 30/016* (2013.01); *H04M 3/2218* (2013.01); *H04M 3/5183* (2013.01); *H04M 2201/38* (2013.01)

(58) Field of Classification Search
CPC .............. G06Q 30/016; H04M 3/2218; H04M 3/5183; H04M 3/5175; H04M 2201/38
USPC ............. 379/265.01–265.14, 266.1; 705/304
See application file for complete search history.

(56) References Cited

U.S. PATENT DOCUMENTS

| 7,398,224 | B2 | 7/2008 | Cooper |
| 7,412,402 | B2 | 8/2008 | Cooper |
| 9,208,465 | B2 | 12/2015 | Grasso et al. |
| 2004/0210475 | A1 | 10/2004 | Starnes et al. |
| 2006/0233348 | A1 | 10/2006 | Cooper |
| 2009/0018996 | A1* | 1/2009 | Hunt ...................... G06Q 30/02 |
| 2011/0261049 | A1* | 10/2011 | Cardno .................. G06Q 10/10 |
| | | | 345/419 |
| 2012/0087486 | A1* | 4/2012 | Guerrero ............. H04M 3/5175 |
| | | | 379/265.02 |
| 2012/0142310 | A1* | 6/2012 | Pugh ................... H04L 41/0893 |
| | | | 455/406 |

OTHER PUBLICATIONS

International Search Report for International Application No. PCT/US2012/053649, dated Nov. 16, 2012, 2 pages.
International Written Opinion for International Application No. PCT/US2012/053649, dated Nov. 16, 2012, 5 pages.

* cited by examiner

*Primary Examiner* — Harry S Hong
(74) *Attorney, Agent, or Firm* — TraskBritt

(57) ABSTRACT

For processing call center data, an access module receives call system data for a plurality of users. The access module further receives customer relationship management (CRM) data and receives user data for the plurality of users. A display module displays the call system data, the CRM data, and the user data in a temporal relationship for a first user as dashboard data.

20 Claims, 17 Drawing Sheets

| Call Start 452a | Call End 454a | Hold Start 456a | Hold End 458a | ID Number 460a | User ID 462a |
|---|---|---|---|---|---|
| Call Start 452b | Call End 454b | Hold Start 456b | Hold End 458b | ID Number 460b | User ID 462b |
| Call Start 452c | Call End 454c | Hold Start 456c | Hold End 458c | ID Number 460c | User ID 462c |

FIG. 8

| ID Number 460a | Number 472a | Name 474a | Address 476a | Purchase 478a | Outcome 480a | Timestamp 482a |
|---|---|---|---|---|---|---|
| ID Number 460b | Number 472b | Name 474b | Address 476b | Purchase 478b | Outcome 480b | Timestamp 482b |
| ID Number 460c | Number 472c | Name 474c | Address 476c | Purchase 478c | Outcome 480c | Timestamp 482c |

PROCESSING CALL CENTER DATA

PRIORITY CLAIM

This application is a National State Entry of, and claims the benefit of the priority date of, International Application No. PCT/US2012/053649, filed Sep. 4, 2012, entitled "PROCESSING CALL CENTER DATA."

FIELD

The subject matter disclosed herein relates to processing data and, more particularly, relates to processing call center data.

BACKGROUND

Description of the Related Art

Call centers interact with large numbers of customers and originate substantial commerce. Small modifications in call center operations can have enormous effects on the profitability of the call center.

BRIEF SUMMARY

A method for processing call center data is disclosed. An access module receives call system data for a plurality of users. The access module further receives customer relationship management (CRM) data and receives user data for the plurality of users. A display module displays the call system data, the CRM data, and the user data in a temporal relationship for a first user as dashboard data. An apparatus and computer program product also perform the functions of the method.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the accompanying drawings. Understanding that these drawings depict only some embodiments and are not therefore to be considered to be limiting of scope, the embodiments will be described and explained with additional specificity and detail through the use of the accompanying drawings, in which:

FIG. 8 is a schematic block diagram illustrating one embodiment of a call system database;

FIG. 9 is a schematic block diagram illustrating one embodiment of a customer relationship management (CRM) database;

FIG. 14 is a drawing illustrating one embodiment of a dashboard with monitoring data;

DETAILED DESCRIPTION OF THE INVENTION

Figure 1:
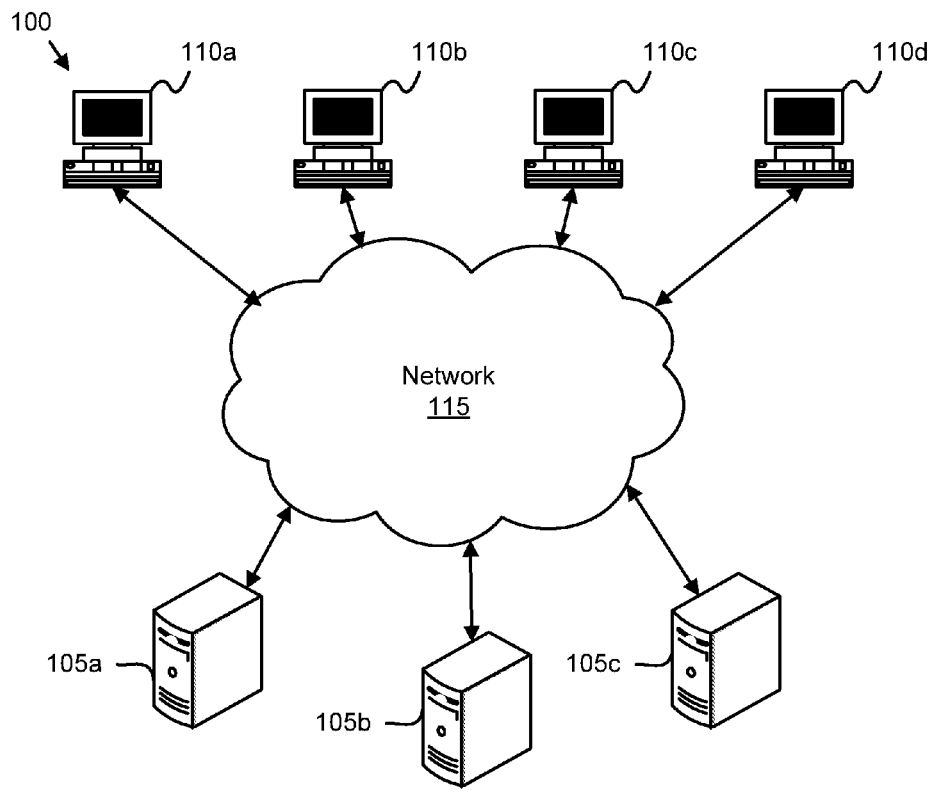
FIG. 1 is a schematic block diagram illustrating one embodiment of a call center system.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer-readable program code embodied thereon.

Many of the functional units described in this specification have been labeled as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer-readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer-readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer-readable program code may be stored and/or propagated on in one or more computer-readable medium(s).

The computer-readable medium may be a tangible computer-readable storage medium storing the computer-readable program code. The computer-readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer-readable storage medium may include, but are not limited to, a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer-readable storage medium may be any tangible medium that can contain, and/or store computer-readable program code for use by and/or in connection with an instruction execution system, apparatus, or device.

The computer-readable medium may also be a computer-readable signal medium. A computer-readable signal medium may include a propagated data signal with computer-readable program code embodied therein, for example, in baseband or as part of a carrier wave. Such a propagated signal may take any of a variety of forms including, but not limited to, electrical, electro-magnetic, magnetic, optical, or any suitable combination thereof. A computer-readable signal medium may be any computer-readable medium that is not a computer-readable storage medium and that can communicate, propagate, or transport computer-readable program code for use by or in connection with an instruction execution system, apparatus, or device. Computer-readable program code embodied on a computer-readable signal medium may be transmitted using any appropriate medium including, but not limited to, wire-line, optical fiber, Radio Frequency (RF), or the like, or any suitable combination of the foregoing. In one embodiment, the computer-readable medium may comprise a combination of one or more computer-readable storage mediums and one or more computer-readable signal mediums. For example, computer-readable program code may be both propagated as an electro-magnetic signal through a fiber optic cable for execution by a processor and stored on RAM storage device for execution by the processor.

Computer-readable program code for carrying out operations for aspects of the present invention may be written in any combination of one or more programming languages, including an object oriented programming language such as JAVA®, Smalltalk, C++, PHP or the like and conventional procedural programming languages, such as the "C" programming language or similar programming languages. The computer-readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a "pay-as-you-go" model.

The computer program product may be stored on a shared file system accessible from one or more servers. The computer program product may be executed via transactions that contain data and server processing requests that use Central Processing Unit (CPU) units on the accessed server. CPU units may be units of time such as minutes, seconds, hours on the central processor of the server. Additionally, the accessed server may make requests of other servers that require CPU units. CPU units are an example that represents but one measurement of use. Other measurements of use include, but are not limited to, network bandwidth, memory usage, storage usage, packet transfers, complete transactions, etc.

When multiple customers use the same computer program product via shared execution, transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc., approach a capacity so as to affect performance, additional network bandwidth, memory usage, storage, etc., are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer, which then remits payment to the service provider.

In one embodiment, the service provider requests payment directly from a customer account at a banking or financial institution. In another embodiment, if the service provider is also a customer of the customer that uses the computer program product, the payment owed to the service provider is reconciled to the payment owed by the service provider to minimize the transfer of payments.

The computer program product may be integrated into a client, server and network environment by providing for the computer program product to coexist with applications, operating systems and network operating systems software and then installing the computer program product on the clients and servers in the environment where the computer program product will function.

In one embodiment, software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer-readable program code. The computer-readable program code may be provided to a processor of a general-purpose computer, special-purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer-readable program code may also be stored in a computer-readable medium that can direct a computer, other programmable data processing apparatus, or other devices to function in a particular manner, such that the instructions stored in the computer-readable medium produce an article of manufacture including instructions, which implement the function/act specified in the schematic flowchart diagrams and/or schematic block diagrams block or blocks.

The computer-readable program code may also be loaded onto a computer, other programmable data processing apparatus, or other devices to cause a series of operational steps to be performed on the computer, other programmable apparatus or other devices to produce a computer-implemented process such that the program code, when executed on the computer or other programmable apparatus, provides processes for implementing the functions/acts specified in the flowchart and/or block diagram block or blocks.

The schematic flowchart diagrams and/or schematic block diagrams in the figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special-purpose hardware-based systems that perform the specified functions or acts, or combinations of special-purpose hardware and computer-readable program code.

The description of elements in each figure may refer to elements of proceeding figures. Like numbers refer to like elements in all figures, including alternative embodiments of like elements.

FIG. 1 is a schematic block diagram illustrating one embodiment of a call center system 100. The system 100 includes one or more workstations 110, a network 115, and one or more servers 105. Users may employ the workstations 110 in placing and receiving telephone calls. A user may be an agent, an operator, or the like. The workstations 110 may provide customer information as will be described hereafter. The workstations 110 may receive the customer information over the network 115 from the servers 105. In addition, the workstations 110 may provide information over the network 115 to the servers 105.

In one embodiment, the network 115 provides telephonic communications for the workstations 110. The telephonic communications may be over a voice over Internet protocol, telephone land lines, or the like. The network 115 may include the Internet, a wide-area network, a local area network, or combinations thereof.

The servers 105 may store one or more databases. The databases may be employed by the users as will be described hereafter. The servers 105 may be one or more discrete servers, blade servers, a server farm, a mainframe computer, or combinations thereof.

Figure 2:
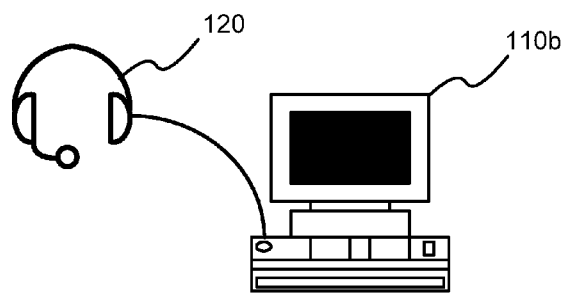
FIG. 2 is a drawing illustrating one embodiment of a workstation.

FIG. 2 is a drawing illustrating one embodiment of a workstation 110. The workstation 110 is the workstation 110 of FIG. 1. The workstation 110 is depicted with a headset 120. The user may communicate audibly through the headset 120. The workstation 110 may allow the user to input data such as a customer address, purchase preferences, credit card information, or the like. In addition, the workstation 110 may display information such as a customer name, purchase history, and the like.

In one embodiment, a workstation 110 is employed by an administrator. The administrator may employ the workstation 110 and one or more servers 105 to process and display call-center data. In the past, the call-center data was provided as discrete information from a database. The embodiments described herein process the call-center data and display the data to increase the effectiveness of the administrator in managing the call-center as will be described hereafter.

Figure 3:
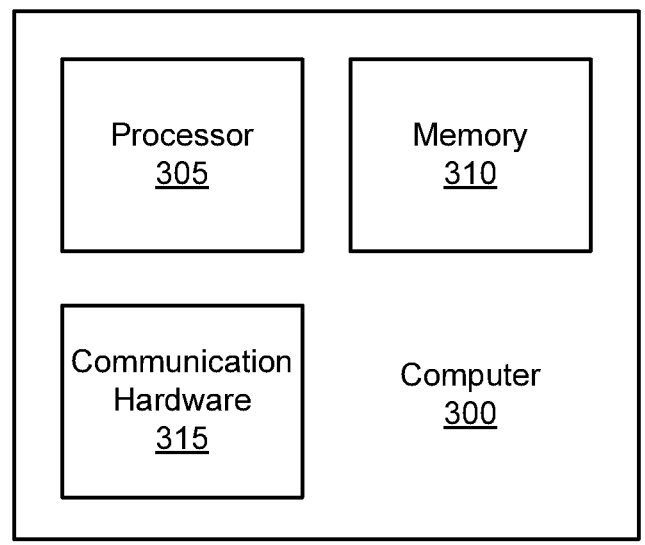
FIG. 3 is a schematic block diagram illustrating one embodiment of a computer.

FIG. 3 is a schematic block diagram illustrating one embodiment of a computer 300. The computer 300 may be the server 105 and/or the workstation 110 of FIG. 1. The computer 300 includes a processor 305, a memory 310, and communication hardware 315. The memory 310 may be a computer-readable storage medium such as a hard disk drive, an optical storage device, a micromechanical storage device, a semiconductor storage device, a holographic storage device, or combinations thereof. The memory 310 may store computer-readable program code. The processor 305 may execute the computer-readable program code to perform the functions of embodiments of the invention.

Figure 4:
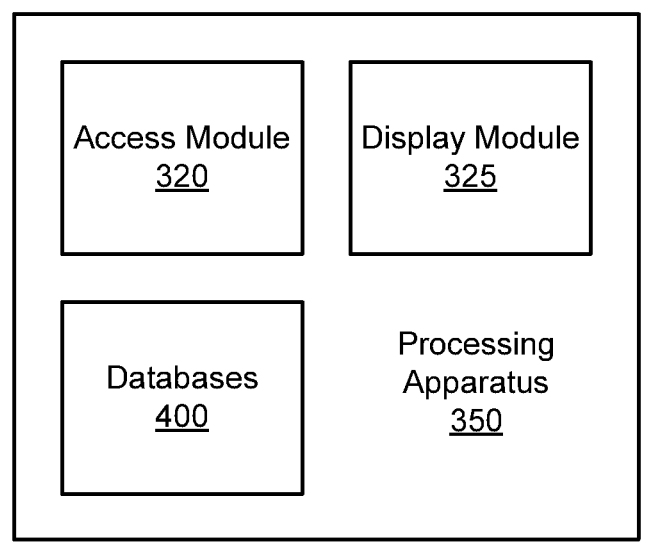
FIG. 4 is a schematic block diagram illustrating one embodiment of a processing apparatus.

FIG. 4 is a schematic block diagram illustrating one embodiment of a processing apparatus 350. The apparatus 350 may be embodied in the computer 300. In addition, the apparatus 350 may be embodied in one or more servers 105, one or more workstations 110, or combinations thereof.

The apparatus 350 includes an access module 320 a display module 325, and one or more databases 400. The access module 320, the display module 325, the databases 400 may be embodied in a computer-readable storage medium, such as the memory 310, storing computer-readable program code. The computer-readable program code may include instructions, data, or combinations thereof. The processor 305 may execute the computer-readable program code.

The access module 320 may receive call system data for a plurality of users. In addition, the access module 320 may receive customer relationship management (CRM) data and receive user data for the plurality of users. The display module 325 may display the call system data, the CRM data, and the user data in a temporal relationship for a first user as dashboard data. The temporal relationship may be a specified time interval. The administrator may specify the time interval. Alternatively, the user may specify the time interval. In one embodiment, selected summary data including the call system data, CRM data, user data, monitoring data, and data calculated as functions of the call system data, CRM data, user data, monitoring data occurring within the specified time interval may be displayed in the temporal relationship.

Figures 5, 6, 7:
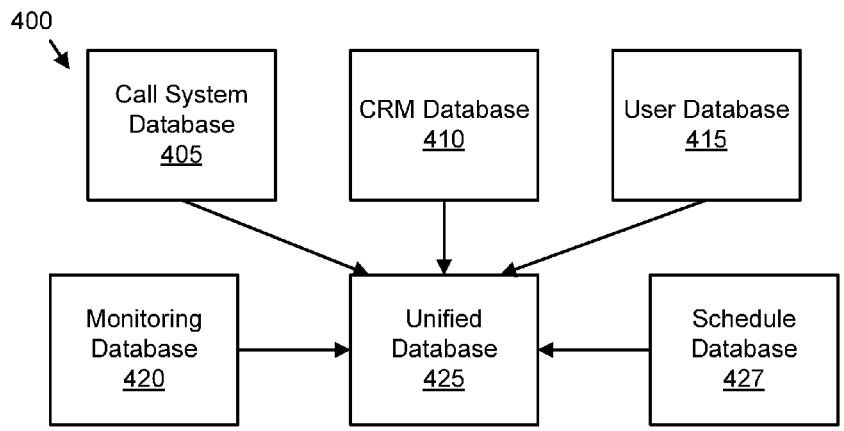
FIG. 5 is a schematic block diagram illustrating one embodiment of databases.
FIG. 6 is a schematic block diagram illustrating one embodiment of a user database.
FIG. 7 is a schematic block diagram illustrating one embodiment of a monitoring database.

FIG. 5 is a schematic block diagram illustrating one embodiment of databases 400. The databases 400 may be stored on one or more of the servers 105 and/or storage devices in communication with the servers 105. Data from the workstations 110 may be communicated over the network 115 to the databases 400. In addition, data from the databases 400 may be provided to the workstations 110 over the network 115.

The databases 400 include a call system database 405, a CRM database 410, a user database 415, monitoring database 420, and scheduling database 427. The databases 400 may also include a unified database 425.

Each of the databases 400 may include one or more tables, queries, structured query language (SQL) code, views, and the like. Alternatively, the databases 400 may be structured as a linked data structures, one or more flat files, or the like. The scheduling database 427 may include scheduled start times, scheduled end times, start times, and end times for the users.

In one embodiment, the access module 320 receives data from the databases 400 and stores the received data in the unified database 425. The databases 400 may communicate the data to the unified database 425 at one or more specified intervals. Alternatively, the access module 320 may query the databases 400 for the data. The access module 320 may query the databases 400 at one or more specified intervals.

FIG. 6 is a schematic block diagram illustrating one embodiment of the user database 415. The user database 415 includes a plurality of entries 490. Each entry 490 may include a user identifier (ID) 462, training information 492, a training length 494, a training evaluation 496, and incentive information 498.

The user ID 462 may identify the user. The user ID 462 may be an employee number, a hash of an employee number, or the like. The training information 492 may record training sessions, training modules and training module progress, management interactions, and the like referred to herein is training. The training length 494 may quantify the amount of time invested in a training by the user. For example, the training length 494 and an amount of time spent viewing a training module. The training evaluation 496 may include test scores, an instructor evaluation, a self-evaluation, course ratings, or combinations thereof. The incentive information 498 may record incentives that are offered to the user, whether an incentive was awarded, the time interval required to earn the incentive, and the like.

FIG. 7 is a schematic block diagram illustrating one embodiment of a monitoring database 420. The monitoring database 420 includes a plurality of entries 430. Each entry may include the user ID 462, an ID number 460, a timestamp 432, and results information 434. The user ID 462 may be the user ID 462 of FIG. 6. The ID number 460 may be a telephone number of a customer, a customer index number, or other number that uniquely identifies the customer. The timestamp 432 may record a time of a telephone conversation between the user and the customer. The results information 434 may record the outcome of the conversation between the user and the customer. For example, the results information 434 may record whether is the customer elected to purchase an item, upgrade service, continue using a service or product rather than canceling or returning the service or product, or the like.

FIG. 8 is a schematic block diagram illustrating one embodiment of a call system database 405. The call system database 405 may be a custom database, a commercially licensed database, or combinations thereof. The call system database 405 may record information about a telephone conversation between the user and a customer.

The call system database 405 may include a plurality of entries 450. Each entry 450 may be generated in response to a telephone conversation, a video conversation, a text conversation, or combinations thereof. In one embodiment, each entry 450 includes a call start time 452, a call end time 454, a hold start time 456, a hold end time 458, the ID number 460, and the user ID 462.

The call start time 452 may record a time a telephone conversation begins. The call end time 454 may record when the telephone conversation terminates. The hold start time 456 may record a start of a hold interval. The hold end time 458 may record an end of the hold interval. For example, the user may put the customer on hold in order to perform a function such as consulting with the supervisor, checking on product and/or pricing and availability, and the like. The hold start time 456 may record when the hold interval started and the hold end time 458 may record when the hold interval ended. In one embodiment, each entry may include one or more call start times 452, call end times 454, hold start times 456, and hold end times 458. The ID number 460 is the ID number 460 of FIG. 7. The user ID 462 as the user ID 462 of FIGS. 6 and 7.

FIG. 9 is a schematic block diagram illustrating one embodiment of a CRM database 405. The CRM database 410 may be a custom database, a commercially licensed database, or combinations thereof. The CRM database 410 may include a plurality of entries 470. The ten entries 470 may include the ID number 460, a number 472, a name 474, an address 476, purchase information 478, outcome information 480, and a timestamp 482.

The ID number 460 may be the ID number 460 of FIGS. 7 and 8. The number 472 may be a telephone number, an email address, or other communication address. The name 474 may be the customer name. The address 476 may be the customer address.

The purchase information 478 may include all purchases by the customer. In one embodiment, the purchase information 478 references a separate table. The purchase information 478 may include purchases including product purchases, service purchases, service contracts, service information, return information, and combinations thereof. The purchase information 478 may also include product upgrades, products downgrades, product cancellations, and the like.

The outcome information 480 may record results from each conversation with the customer. The outcome information 480 may include customer comments, customer commitments, user notes, automated survey results, user survey results, and the like.

In one embodiment, the timestamp 482 records a time of each conversation with the customer. The timestamp 482 may record a plurality of times. The times recorded in the timestamp 482 may be used to identify entries in other databases 400 that correspond to entries 470 of the CRM database 410.

Figure 10:
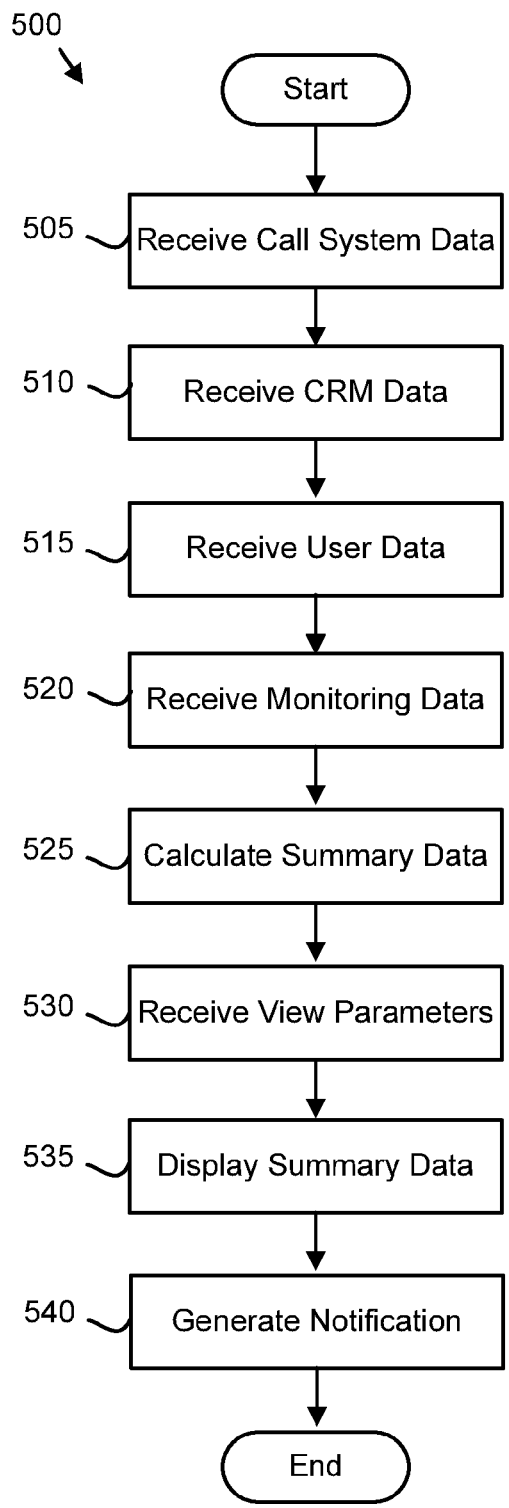
FIG. 10 is a schematic flowchart diagram illustrating one embodiment of a call center data processing method.

FIG. 10 is a schematic flowchart diagram illustrating one embodiment of a call center data processing method 500. The method 500 may be performed by the apparatus 350. Alternatively, the method 500 may be performed by a computer program product such as computer-readable storage medium storing computer-readable program code.

The method 500 starts and the access module 320 receives 505 call system data. The call system data may be received 505 from the call system database 405. In one embodiment, a server 105 storing the call system database 405 communicates the call system data to the access module 320 at specified times. Alternatively, the access module 320 may request the call system data from the server 105 and/or the call system database 405 at specified times. The specified times may include the ranges of every 1 to 10 minutes, every 10 to 30 minutes, every 30 to 90 minutes, every 4 to 12 hours, or the like.

The access module 320 may further receive 510 CRM data. The CRM data may be received 510 from the CRM database 410. In one embodiment, a server 105 storing the CRM database 410 communicates the CRM data to the access module 320 at the specified times. Alternatively, the access module 320 may request the CRM data from the server 105 and/or the CRM database 410 at the specified times.

The access module 320 may receive 515 user data. In one embodiment, a server 105 storing the user database 415 communicates the user data to the access module 320 at the specified times. Alternatively, the access module 320 may request the user data from the server 105 and/or the user database 415 at the specified times.

In one embodiment, the access module 320 receives 520 monitoring data. A server 105 storing a monitoring database 420 may communicate the monitoring data to the access module 320 at the specified times. Alternatively, the access module 320 may request a monitoring data from the server 105 and/or the monitoring database 420 at the specified times.

In one embodiment, a server 105 may execute computer-readable program code that activates a timer. The timer may count down a time interval equivalent to the specified time. When the timer counts to zero, a computer-readable program code may generate an interrupt and branch control to an access thread. The access thread may gather specified data from a least one of the call system database 405, the CRM database 410, the user database 415, and the monitoring database 420 and communicate the specified data to the access module 320. Alternatively, the access thread may request the specified data from at least one of call system database 405, the CRM database 410, the user database 415, and the monitoring database 420. In addition, the access thread may activate a listener that listens on one or more specified ports for the specified data.

In one embodiment, the access module 320 calculates 525 summary data from the call system data, CRM data, user data, and monitoring data. The summary data may be the call system data, CRM data, user data, and monitoring data. In addition, the summary data may comprise summary data elements that are calculated as a function of at least one other summary data element. Table 1 lists exemplary summary data elements.

TABLE 1

| Summary Data | Description |
| --- | --- |
| Abandons | Number of customers who hung up before speaking with an agent |
| Additional product ideal percentage | Percentage of times an offer was made on an additional product in an ideal way |
| Additional product offer percentage | Percentage of times an offer was made on an additional product |
| After Trial Full Refund Percent | Percentage of full refunds after trial period |
| Agent count | Number of users |
| Answered | Number of calls that were answered |
| AvailableTime | WaitTime + HandleTime (total time a user is available to take a call or on/closing a call) |
| Average close time | Average time need to close sale |
| Average handle time | Average time to complete a call |
| Average talk time | Average time talking with customer |
| CallCloseTime | Time to make a close calculated from call data rather than user data |
| CallHandleTime | HandleTime calculated from call data rather than user data |
| Calls | Number of calls received |
| Calls per hour | Calls per hour |
| CallsReceived | number of calls received rather than the number of calls handled (If a call goes from 10:45AM to 11:15 AM, Calls would count half the call in each hour. CallsReceived counts the entire call in the hour where it was received) |
| CallTalkTime | TalkTime that is calculated from the call data rather than user data |
| CallTime | Minutes of connected call time |
| Close Percent | Percentage of time spent on the close portion of calls |
| CloseTime | Time an agent spends filling out notes after a call ends |
| Communication skills percentage | Score on communication skills evaluation |
| Contacts | Number of calls that resulted in a contact |
| Conversation Percent | Percentage of calls resulting in an account conversion |
| Email percentage | Percentage of follow-up emails sent |
| Five-star percentage | Percentage of five star ratings from customer evaluation |
| Focus form | Score on a QA form |
| Full engagement percentage | Percent of full engagement evaluations |
| Full interview percentage | Percentage that interview is completed |
| HandleTime | Time to complete a call |
| HeadCount | Number of users |
| Hold Percent | Percent of call time a customer is on hold |
| HoldTime | Amount of time a user is on hold |
| InServiceLevel | Number of calls that were answered by an agent before the service level threshold was reached |
| Interview percentage | Interviews as percentage of calls |
| New Package | New package sales |
| New Package Percent | Percentage of calls resulting in new package sales |
| New Product | New product sales |
| New Product Percent | Percentage of calls resulting in new product sales |
| Offer percentage | Target percentage for making an offer |
| Offer rate | Rate that offer is made |
| Orders | Number of calls that resulted in a sale |

TABLE 1-continued

| Summary Data | Description |
| --- | --- |
| Package ideal offer percentage | Target percentage for making a package offer |
| Package ideal percentage | Percentage of instances a package offer is made |
| Percent Hold | Percentage of time spent on hold |
| Product ideal percentage | Percentage of instances a product offer is made in an ideal way |
| Product offer percentage | Percentage of instances a product offer is made |
| QA metric | Relevant quality assurance metric |
| QueueTime | Time a customer is on hold waiting to be connected to a user |
| Recap | Recap of agreement with customer |
| Revenue | Revenue generated from a sale |
| Revenue per call | Average revenue generated for each call |
| Revenue per hour | Revenue per hour |
| Revenue per order | Revenue per order |
| RPC | Revenue per call |
| RPH | Revenue per hour |
| RPO | Revenue per order |
| Sales | Sales per user |
| Sales per hour | Sales per hour |
| Save Percent | Percentage of cancelations that are saved |
| Service level | Service level of call |
| SLACalls | Number of calls where the call was answered or the customer was on hold over a certain threshold |
| Talk percent | Percent of time spent on the phone |
| TalkTime | Amount of time a user is on the phone |
| Test | Test score |
| Test Q | Test question |
| Total revenue | Total revenue |
| TotalTime | AvailableTime + UnavailableTime (Total time a user is logged into the system) |
| Tran | Calls transferred elsewhere |
| Transfer Percent | Percentage of calls transferred elsewhere |
| Unavailable percent | Percentage of time user is unavailable |
| Unavailable time | Time a user is unavailable |
| UnavailableTime | Time a user is logged into the system but unavailable to take a call |
| Wait percent | Percentage of time user is waiting to receive a call |
| WaitTime | Time a user is waiting to receive a call |

The summary data may be stored in a unified database 425. In addition, portions of the call system data, CRM data, user data, and monitoring data may be stored in the unified database 425 as summary data. In one embodiment, the summary data is calculated 525 as the summary data is received. Alternatively, the summary data may be calculated 525 as a batch job.

In one embodiment, contacts are calculated from a number of entries 450 in the call system database 405. Call minutes may be calculated from the calls start time 452 and the call end time 454. Hold minutes may be calculated from the hold start time 456 and the hold end time 458. Total time may be calculated as call minutes plus wait minutes. Percent hold may be calculated as hold minutes divided by talk minutes. Conversion percent may be calculated as purchases 478 divided by contacts. Conversion percent may be calculated as outcomes 480 where the customer converts divided by contacts. Hold percent may be calculated as outcomes 480 where the customer maintains an account divided by contacts. "Tran" may be a number of calls transferred elsewhere.

New product may be calculated as purchases 478 where the customer purchases a new product. New package may be calculated as total outcomes 480 where the customer signs up for a new package. New product percentage may be calculated as new products divided by contacts. New package percentage may be calculated as new packages divided by contacts.

Revenue may be total gross revenue for a user, a team, a group, or the like. In one embodiment, "RPI" is calculated as total revenue per hour. "RPO" may be calculated as revenue per user and/or revenue per operator. "RPC" may be calculated as revenue per contact. "SPH" may be calculated as sales per hour. Sales may be unit sales, total orders, or combinations thereof.

In one embodiment the display module 325 receives 530 view parameters. The view parameters may specify how to the display the summary data on a dashboard. The display module 325 may receive 530 the view parameters through a workstation 110 from an administrator and/or from the user. Options for view parameters will be described hereafter. The view parameters may specify a specified order for arranging dashboard data.

The display module 325 may further display 535 summary data from the unified database 425 as dashboard data in accordance with the view parameters. In one embodiment, the display module 325 displays 535 the call system data of the call system database 405, the CRM data of the CRM database 410, and the user data of the user database 415. The display module 325 may also display monitoring data from the monitoring database 420. In addition, the display module 325 may display summary data calculated as functions of the call system data, the CRM data, the user data, and the monitoring data. The display of the summary data as dashboard data will be described hereafter in more detail.

One or more summary data elements may be selected as metrics. In addition, one or more summary data elements may be selected as success rates. Targets may be selected for one or more summary data elements. In addition, a target limit may be selected for a target. A target limit may be a percentage of a target.

The display module 325 may monitor a target for at least one summary data element for at least one user. For example, the display module 325 may monitor a "Close Percentage" for a user. Alternatively, the display module 325 may monitor a Full Engagement Percentage for a team. In one embodiment, the display module 325 generates 540 a notification and the method 500 ends. The notification may be generated if a summary data element or metric satisfies a target. Alternatively, the notification may be generated if a summary data element or metric exceeds a target limit.

The notification may be displayed on the dashboard to the administrator. In an alternative embodiment, the notification is communicated through email, a phone call, or the like. Alternatively, the notification may be communicated to the user. In a certain embodiment, the notification is communicated to a team leader, floor leader, or the like.

Figure 11:
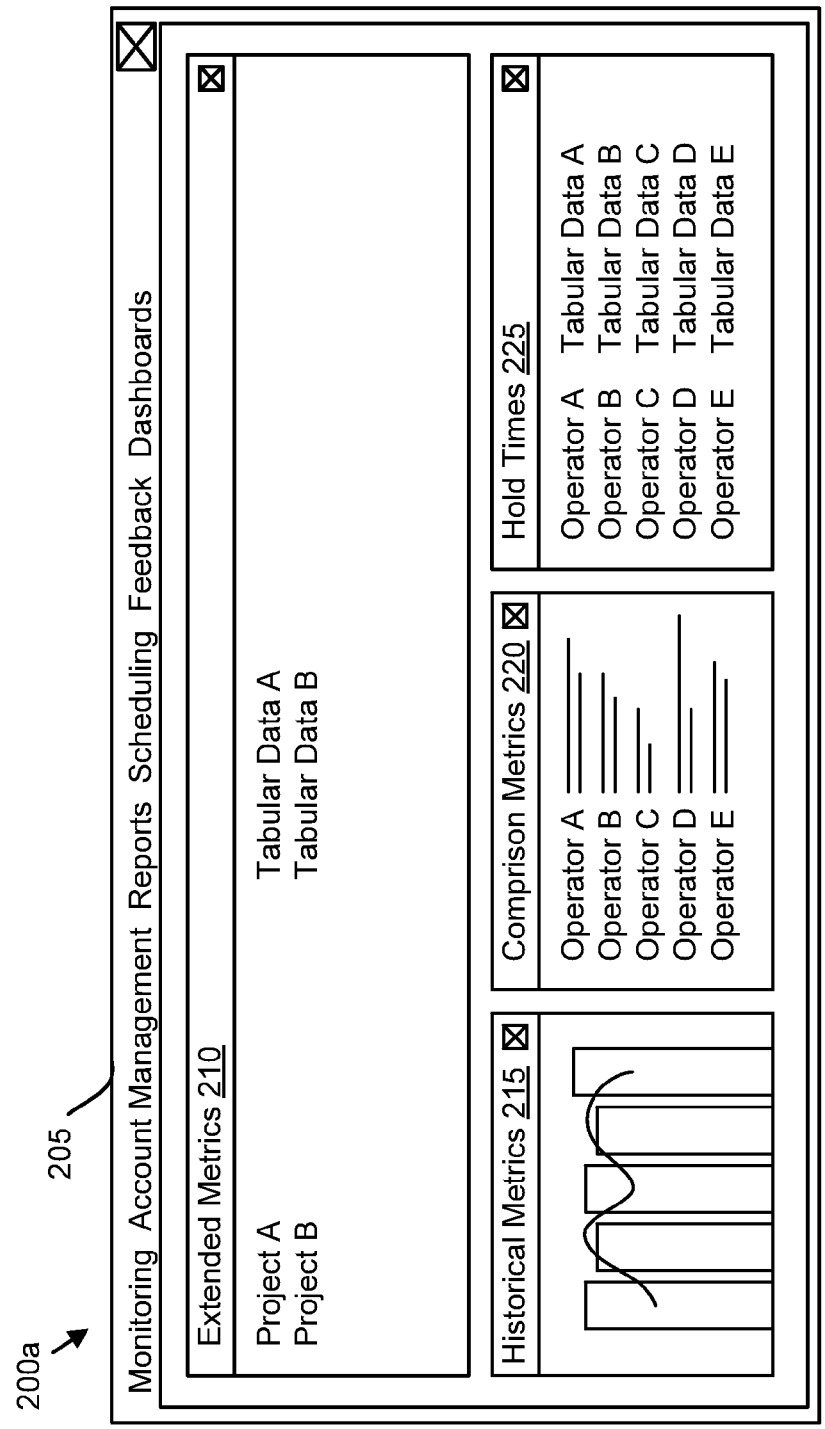
FIG. 11 is a drawing illustrating one embodiment of a dashboard.

FIG. 11 is a drawing illustrating one embodiment of a dashboard 200a. Each dashboard 200a displays 535 summary data as dashboard data. An administrator and/or user may employ the dashboard 200a to manage user performance.

The dashboard 200a includes an options menu 205. In the depicted embodiment, the dashboard 200a further includes extended metrics 210. The extended metrics 210 may display summary data in a tabular form. In the depicted embodiment, summary data for a plurality of projects is displayed as tabular data, graphical data including bar charts, line charts, pie charts, histograms, graphical data, or the like. Cumulative project data may also be displayed. The tabular data may include a success rate.

In one embodiment, the dashboard 200a displays historical metrics 215. Historical metrics 215 may display summary data for one or more time intervals. Time intervals may be an hour, a shift, a day, a week, a month, a quarter, a year, or the like. The historical metrics 215 may be displayed as tabular data, bar charts, line charts, pie charts, histograms, graphical data, or the like.

The dashboard 200a may also display comparison metrics 220. The comparison metrics 220 may compare one or more summary data elements for users, a team, a group, or the like. The summary data elements may be compared as graphs, tabular data, gauges, or the like.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

In one embodiment, the dashboard 200a displays hold times 225. The hold times 225 may be displayed by user team, group, or the like. The hold times 225 may be displayed as tabular data, graphical data, gauges, or the like.

In one embodiment, the dashboard 200a displays summary data organized for a least two projects and cumulative project data for at least two projects. In addition, the dashboard 200a may display dashboard data for the plurality of users organized in at least one hierarchical level.

Figure 12:
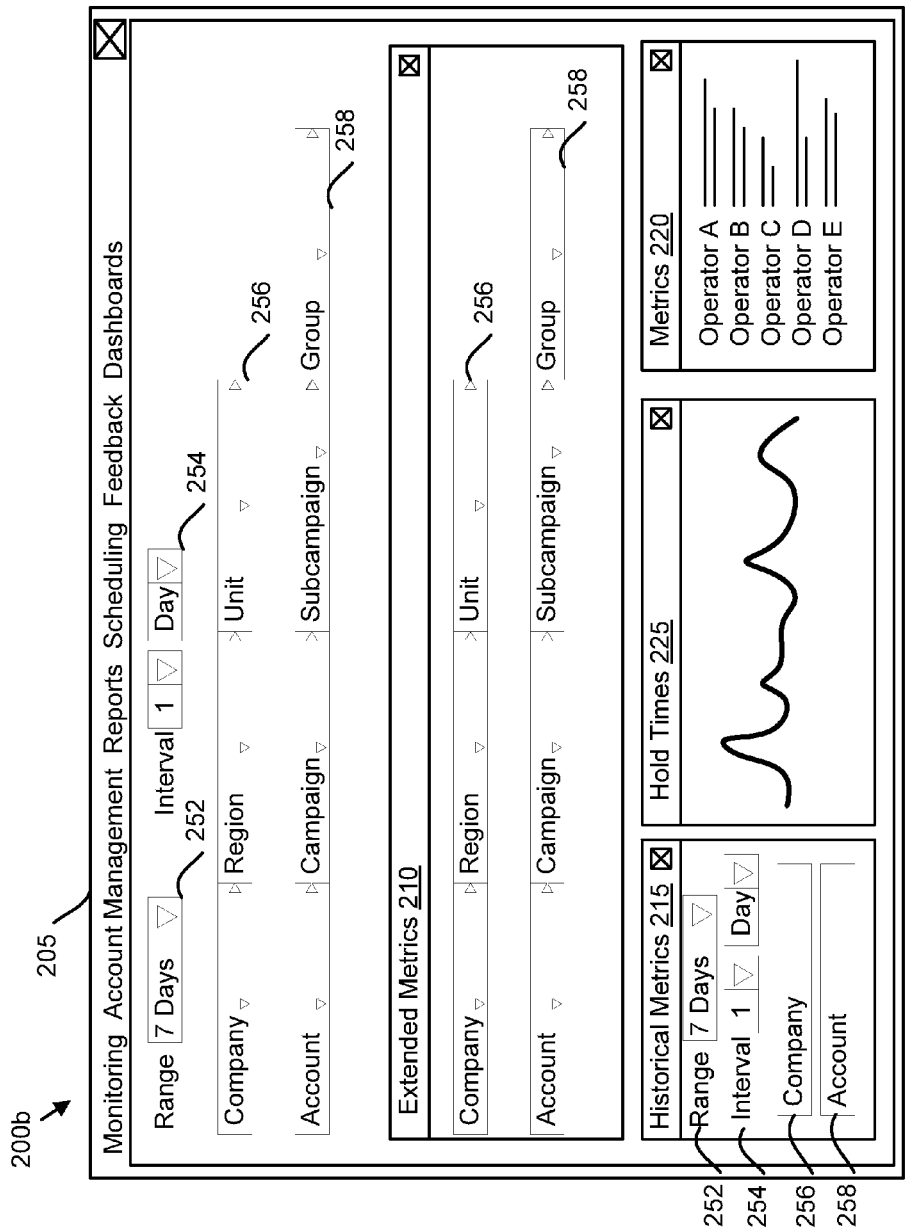
FIG. 12 is a drawing illustrating one alternative embodiment of a dashboard.

FIG. 12 is a drawing illustrating one alternative embodiment of a dashboard 200b. The dashboard 200b is depicted as receiving the view parameters. The view parameters may include a time range 252, a time interval 254, and an entity 256. The entity 256 may include entries for a company or client, a region, and a unit. The view parameters may also include account information 258. The account information 258 may include an account, a campaign, a subcampaign, and a group. The account may be a billing account. The campaign may be a sales campaign for the account. The subcampaign may be a portion of the campaign. The group may be a group of users, a group within the account, or the like.

In one embodiment, the view parameters may be further refined for specified metrics. In the depicted embodiment, the view parameters are refined for the extended metrics 210, the hold time 225, and the comparison metrics 220. In one embodiment, view parameters may be set for a specific display such as the historical metrics 215. For example in response to an administrator command such as the selection of a button or right-click, a metric display such as the historical metrics 215 may allow the administrator and/or user to modify and save view parameters such as the time range 252, the time interval 254, the entity 256, and the account information 258.

Figure 13:
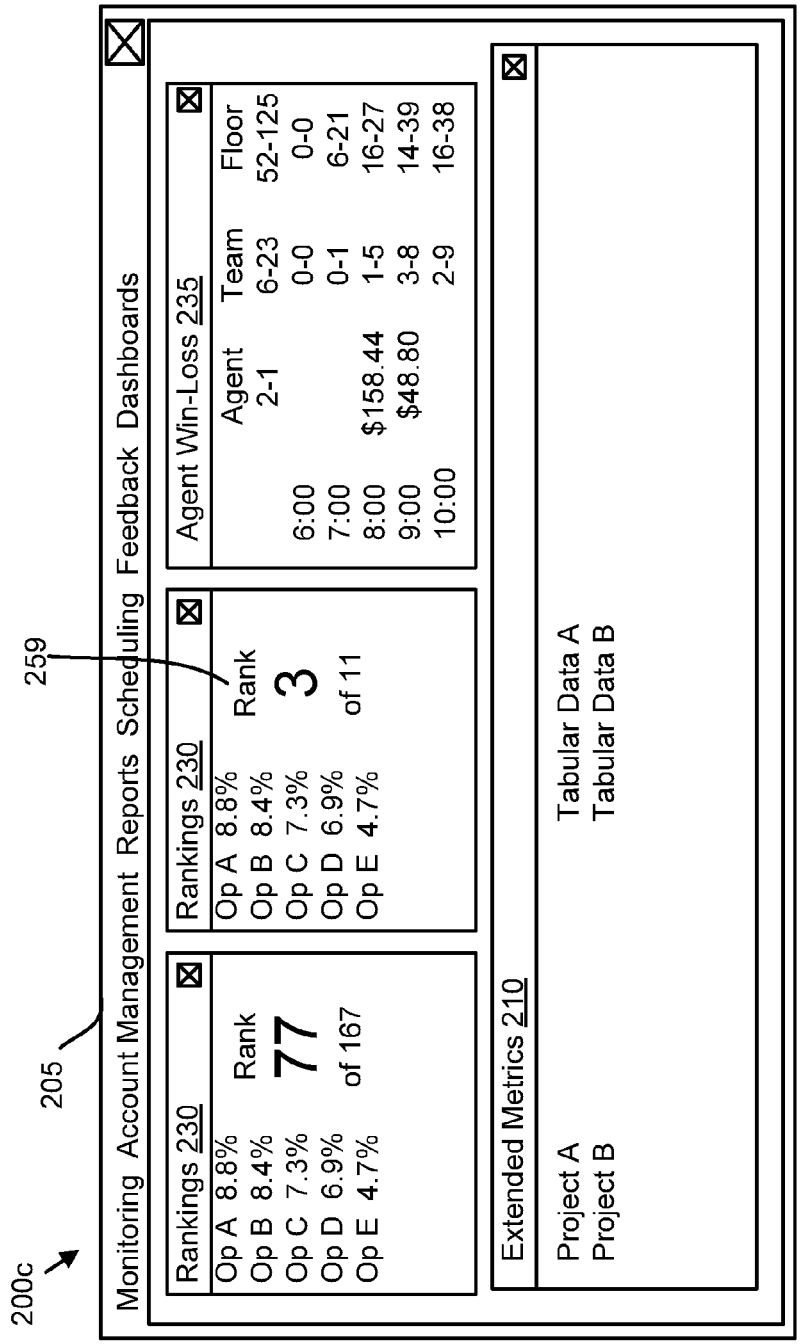
FIG. 13 is a drawing illustrating one alternative embodiment of a dashboard.

FIG. 13 is a drawing illustrating one alternative embodiment of a dashboard 200c. The dashboard 200c is depicted as displaying summary data including rankings 230, agent win-loss metrics 235, and extended metrics 210. The rankings 230 and agent win-loss metrics 235 may be displayed in tabular form, graphical form, as a gauge, or combinations thereof. In one embodiment, a detailed summary ranking 259 for a user, team, group, or the like is displayed. The detailed summary may be a success rate. The summary data may be organized for a plurality of users in at least one hierarchical level such as a team, a group, or the like.

Figure 14:
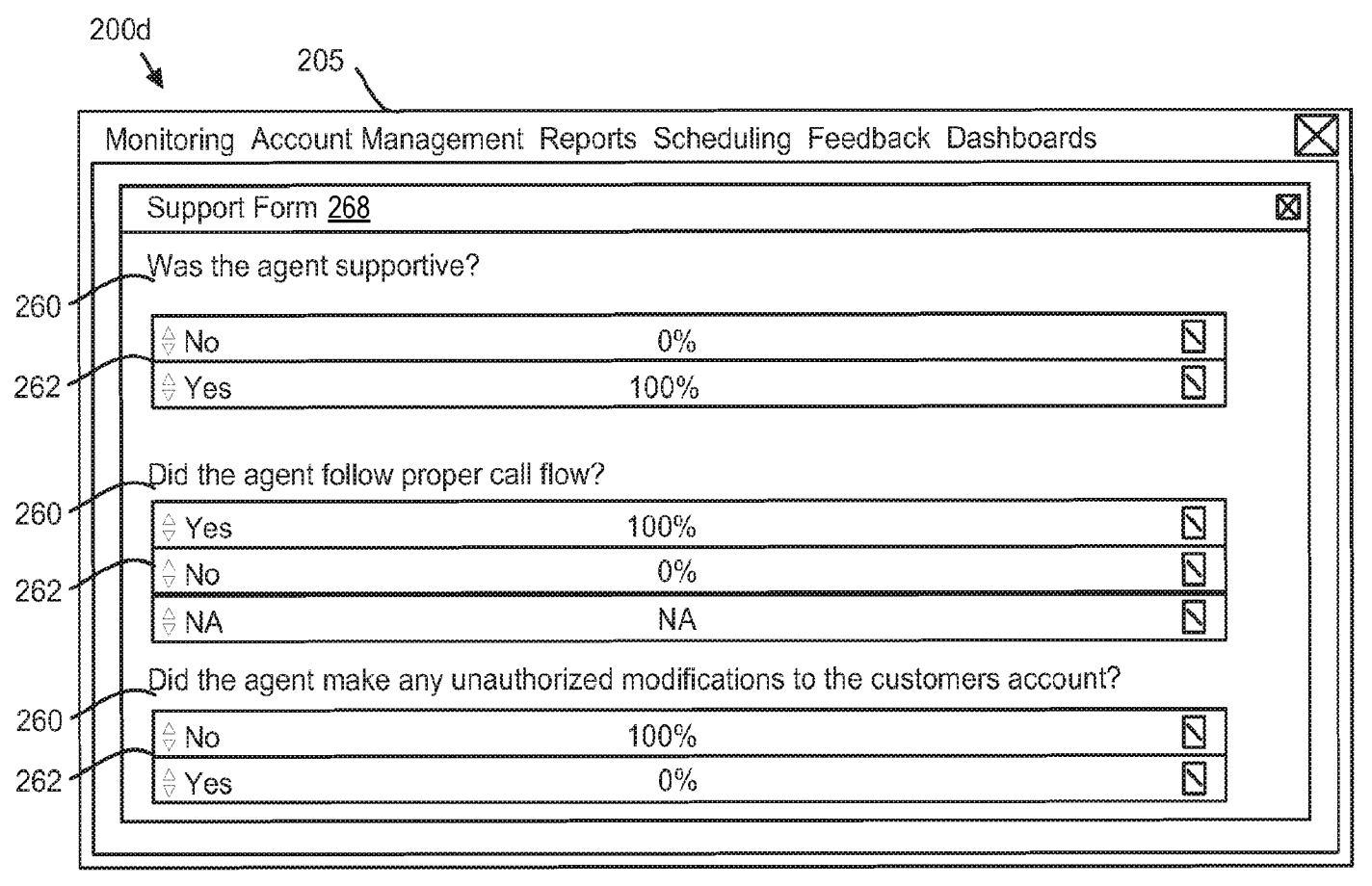

FIG. 14 is a drawing illustrating one embodiment of a dashboard 200d receiving monitoring data. In the depicted embodiment, the monitoring data is collected through a support form 268. The support form 268 includes one or more questions 260 and one or more responses 262. An administrator, supervisor, observer, or the like may enter the responses 262. In one embodiment, an administrator may enter the responses 262 after listening to a conversation between a user and the customer. The monitoring data may be stored in the monitoring database 420.

Figure 15:
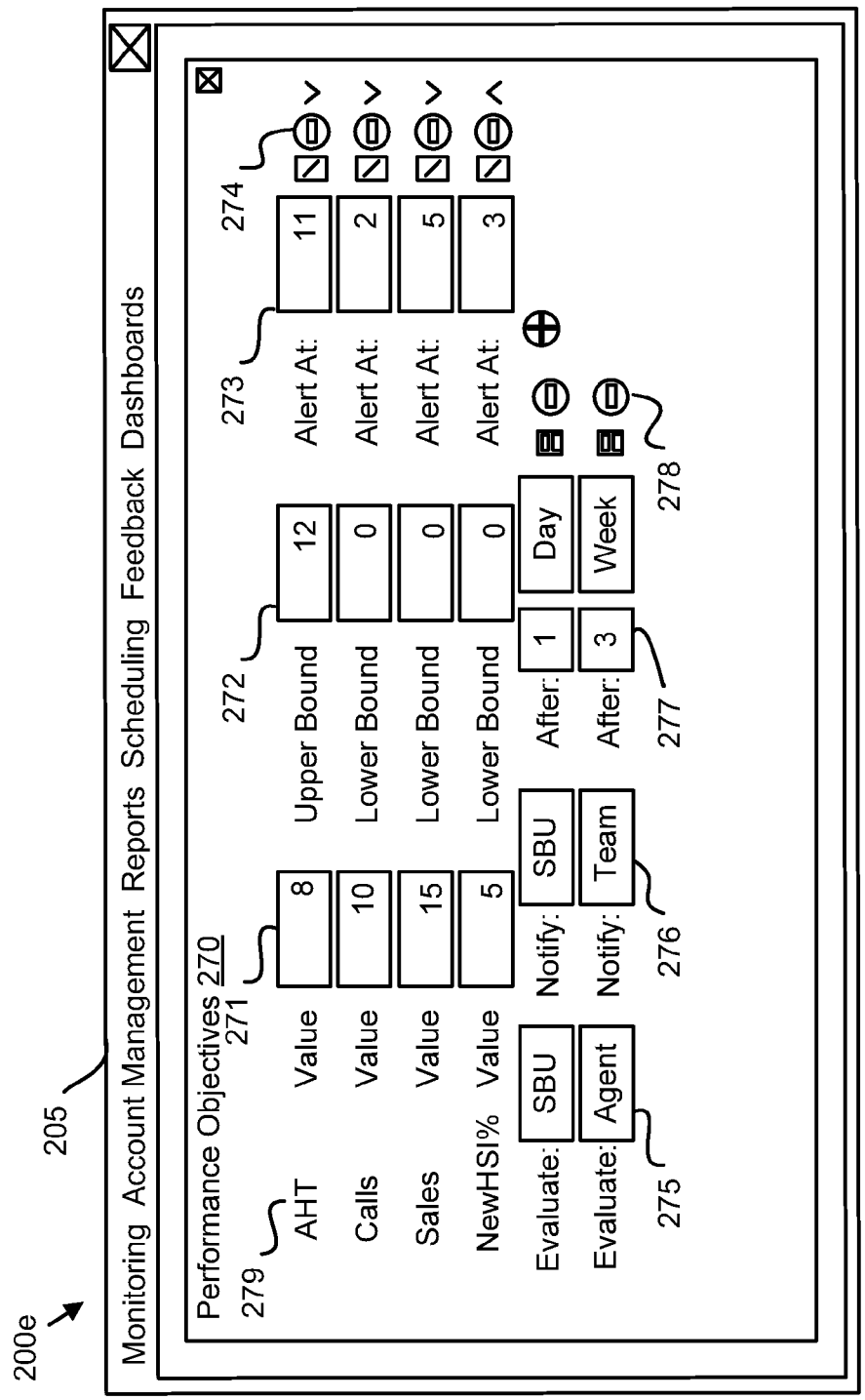
FIG. 15 is a drawing illustrating one embodiment of a dashboard with performance objectives.

FIG. 15 is a drawing illustrating one embodiment of a dashboard 200e receiving performance objectives 270. The performance objectives 270 may include a target 279, a target value in 271, a bound 272, a target limit 273, and controls 274. The target 279 may be a performance objective for a summary data element and/or metric. The bounds 272 may be an upper bound or lower bound for the target 279. The target limit 273 may indicate a threshold for generating a notification. The access module 320 may generate a notification in response to performance exceeding a target limit 273. The controls 274 may be used to edit performance objectives 270, delete performance objectives 270, or reorder the performance objectives 270.

In one embodiment the performance objectives 270 may be modified at a future time. An administrator may select a performance objective 270 and select a level of a hierarchy such as a user, team, or group at evaluate 275 for which the performance objective is calculated, A level of management that receives an alert for the performance objective 270 is specified by at notify 276, and a modification time 277 modifying the performance objective 270. Modification controls 278 may save and/or delete the modifications.

Figure 16:
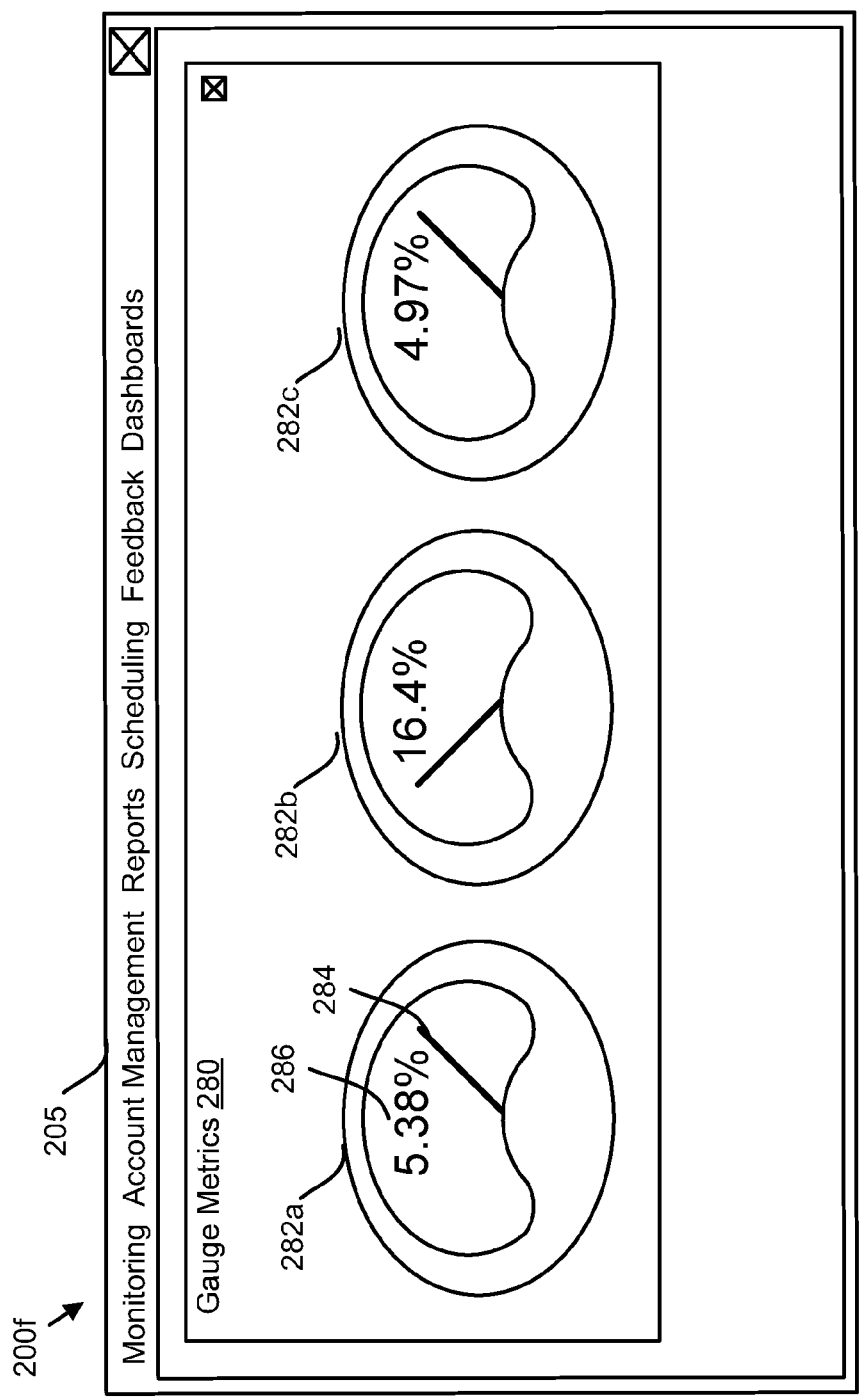
FIG. 16 is a drawing illustrating one embodiment of a dashboard gauge metrics.

FIG. 16 is a drawing illustrating one embodiment of a dashboard 200f with gauge metrics 280. Specified summary data elements are displayed as data on gauges 282. Each gauge 282 may include metric needle 284 and a metric value 286. The metric needle 284 may display a summary data element with respect to an upper bound of a lower bound. The metric value 286 may display an actual value of the summary data element.

Figure 17:
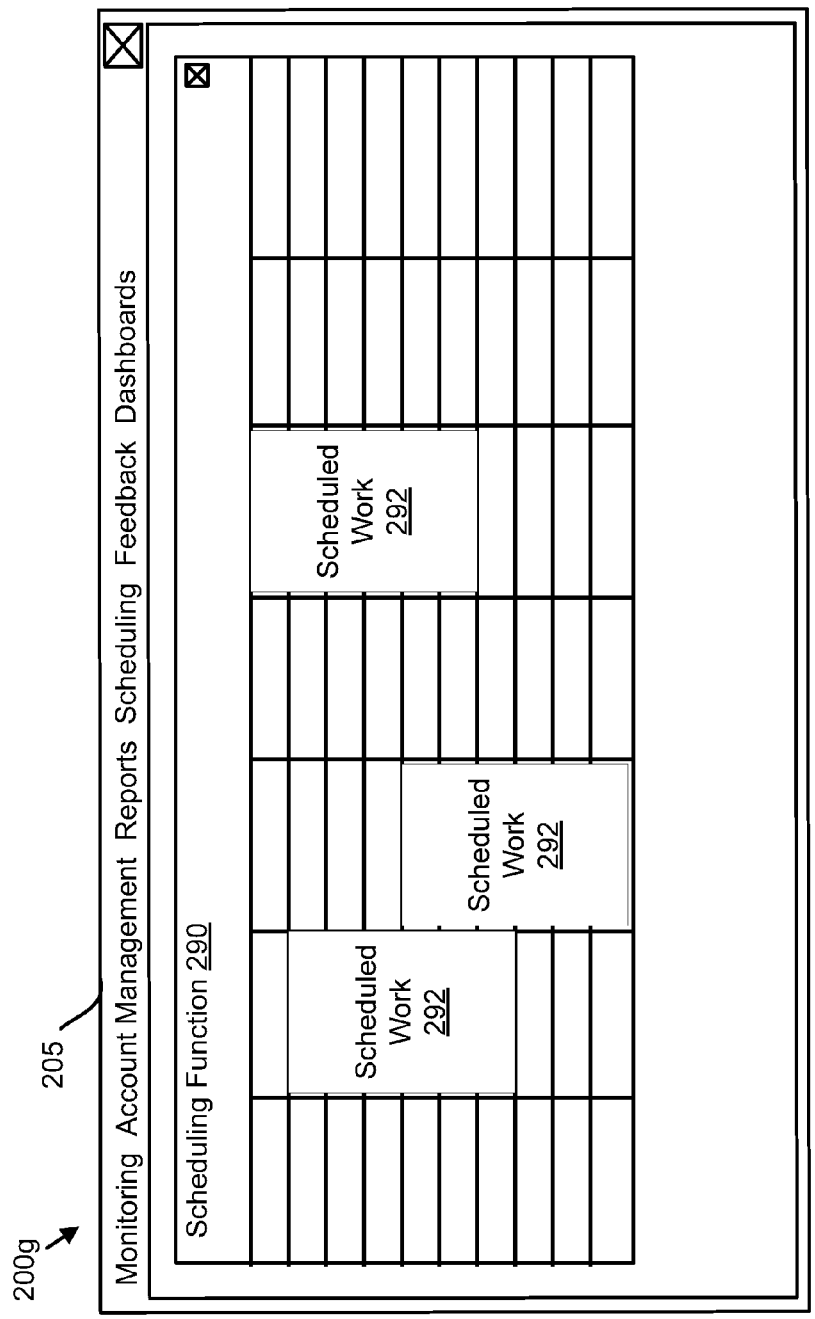
FIG. 17 is a drawing illustrating one embodiment of a dashboard with a scheduling function.

FIG. 17 is a drawing illustrating one embodiment of a dashboard 200g with a scheduling function 290. The administrator may employ the scheduling function 290 to schedule work for a user by designating scheduled work 292 for the user. The scheduled work 292 may include the scheduled start times and scheduled end times of the scheduling database 427. The user may also employ the scheduling function to view the scheduled work 292. In a certain embodiment, the user may indicate available work times through the scheduling function 290.

The administrator and user may also view actual work. The actual work may include the start times and end times of the scheduling database 427. In one embodiment, the administrator enters the scheduled work 292. Alternatively, the scheduled work 292 may be entered by a scheduling algorithm.

Figure 18:
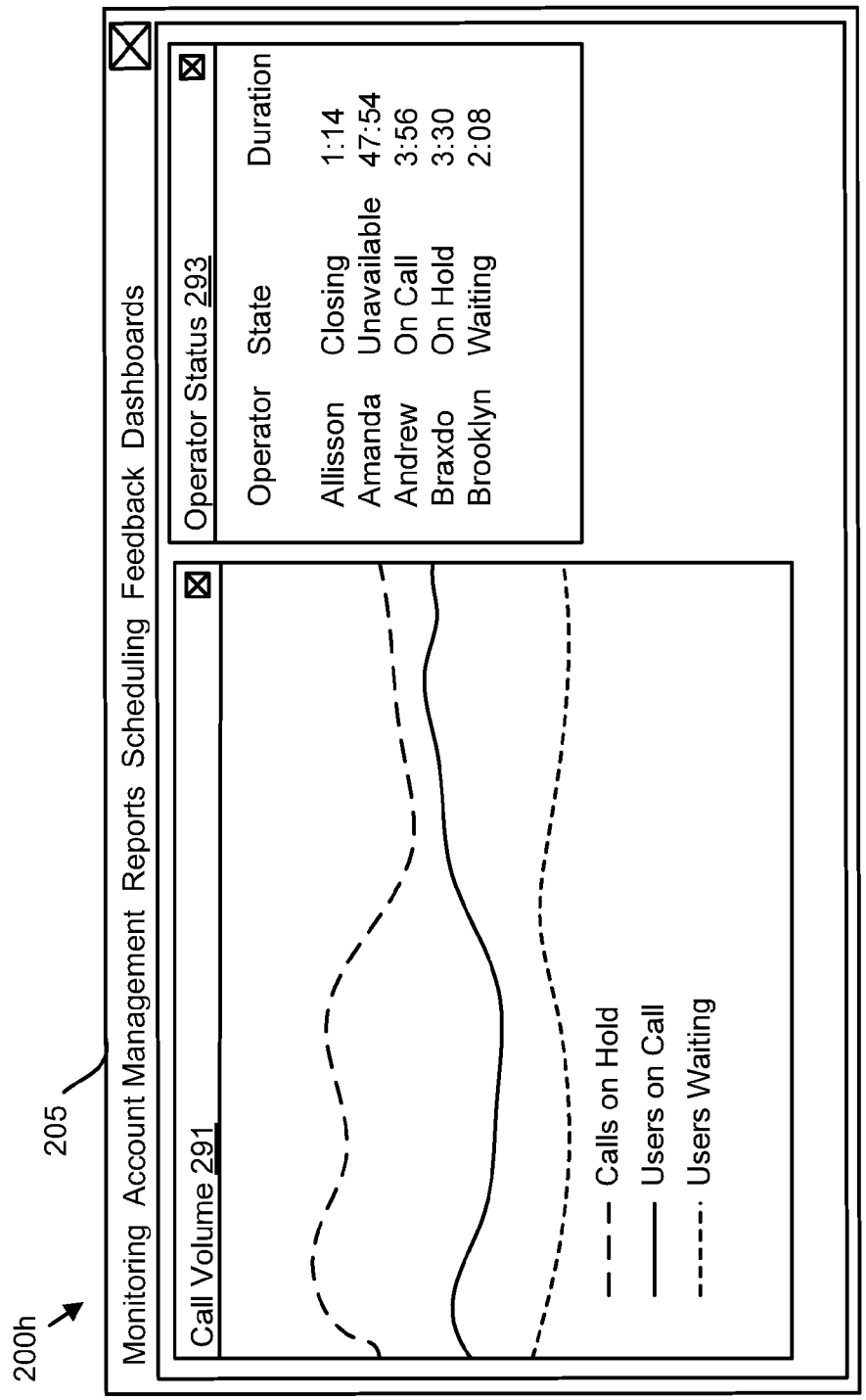
FIG. 18 is a drawing illustrating one embodiment of a dashboard with call volume and agent status metrics.

FIG. 18 is a drawing illustrating one embodiment of a dashboard 200h with call volume metrics 291 and operator status metrics 293. The call volume metrics 291 may indicate a number of calls that are on hold, a number of users on a call, and a number of users that are waiting for a call at times over a specified time interval. For example, the call volume metrics 291 may be shown hourly over a three-day period.

The operator status metric 293 may show users and a state for each user. The state may be selected from the group consisting of closing, unavailable, on call, on hold, and waiting states. The closing stage may indicate that the user is closing a sale. The unavailable state may indicate that the user is not available to take calls. The on-call state may indicate that the user is engaged in a call. The on hold state may indicate that the user is on hold. The waiting state may indicate that the user is waiting for a call. The agent status metric 293 may also show a duration of the state for the user.

Figure 19:
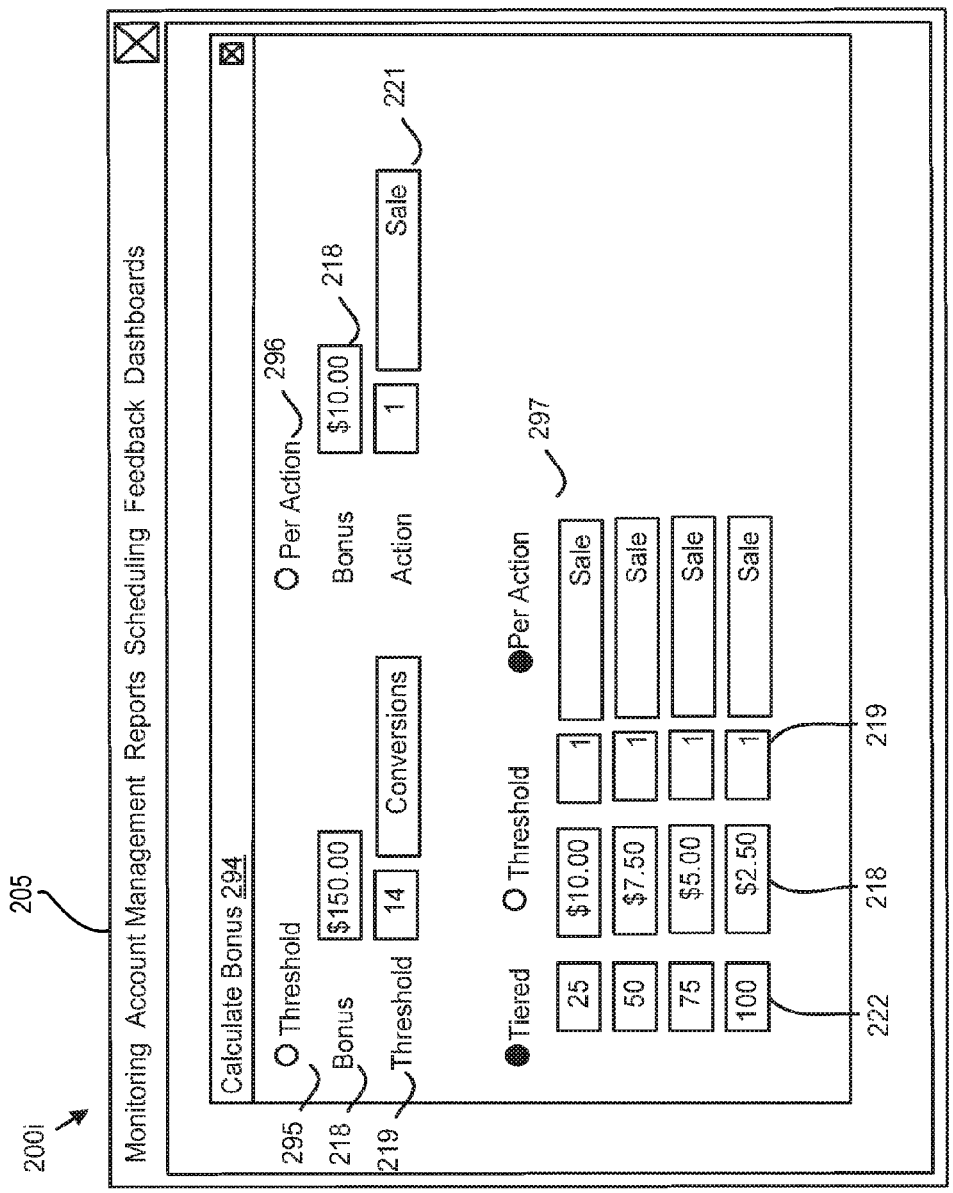
FIG. 19 is a drawing illustrating one embodiment of a dashboard with a calculate bonus function.

FIG. 19 is a drawing illustrating one embodiment of a dashboard 200i with a calculate bonus function 294. In the depicted embodiment, three options are shown for calculating bonuses, a threshold option 295, per action option 296, and a tiered option 297. An administrator may select the desired option for calculating and granting bonuses. One of skill in the art will recognize the invention may be practiced with other options for calculating bonuses. In the depicted embodiment, an option is select with a radio button.

The threshold option 295 receives a bonus amount 218 and a threshold 219. The bonus amount 218 may be credited to a user when the threshold 219 is met. The threshold 219 may be 221 may be a conversion, a sale, no change to an account, or the like. In the depicted example, the user is paid a bonus of $150 for meeting the threshold of 14 conversions.

The per action option 296 receives a bonus amount 218 and an action 221. The bonus amount 218 may be credited to a user each time the action 221 is satisfied. The action 221 may be a conversion, a sale, no change to an account, or the like. In the depicted example, a user is paid a bonus of $10 each time one sale is made.

The tiered option 297 receives one or more tiered percentages 222. In the depicted example, the first tier is from 1% to 25%, the second tier is from 26% to 50%, the third tier is from 51% to 75%, and the fourth tier is from 76% to 100%. One of skill in the art will recognize that the embodiments may be practiced in any number of tiers.

The tiered option 297 may further support a threshold option and a per action option. In the depicted example, the per action option is selected. A bonus 218 is received for each action 221 for each tiered percentage 222. In the depicted example, users in the 1% to 25% tier receive a bonus of $10 for each one sale.

In one embodiment, bonuses may be paid automatically to users. An earned bonus may be credited to a user. An administrator may edit the bonus amount. In addition, the administrator may add a predefined and/or custom message. The user may receive notification of the bonus amount and/or message when released by the administrator. In one embodiment, bonus amounts are automatically released to the user when earned. The bonus amount and/or message may be communicated to a payroll system for payment to the user.

Figure 20:
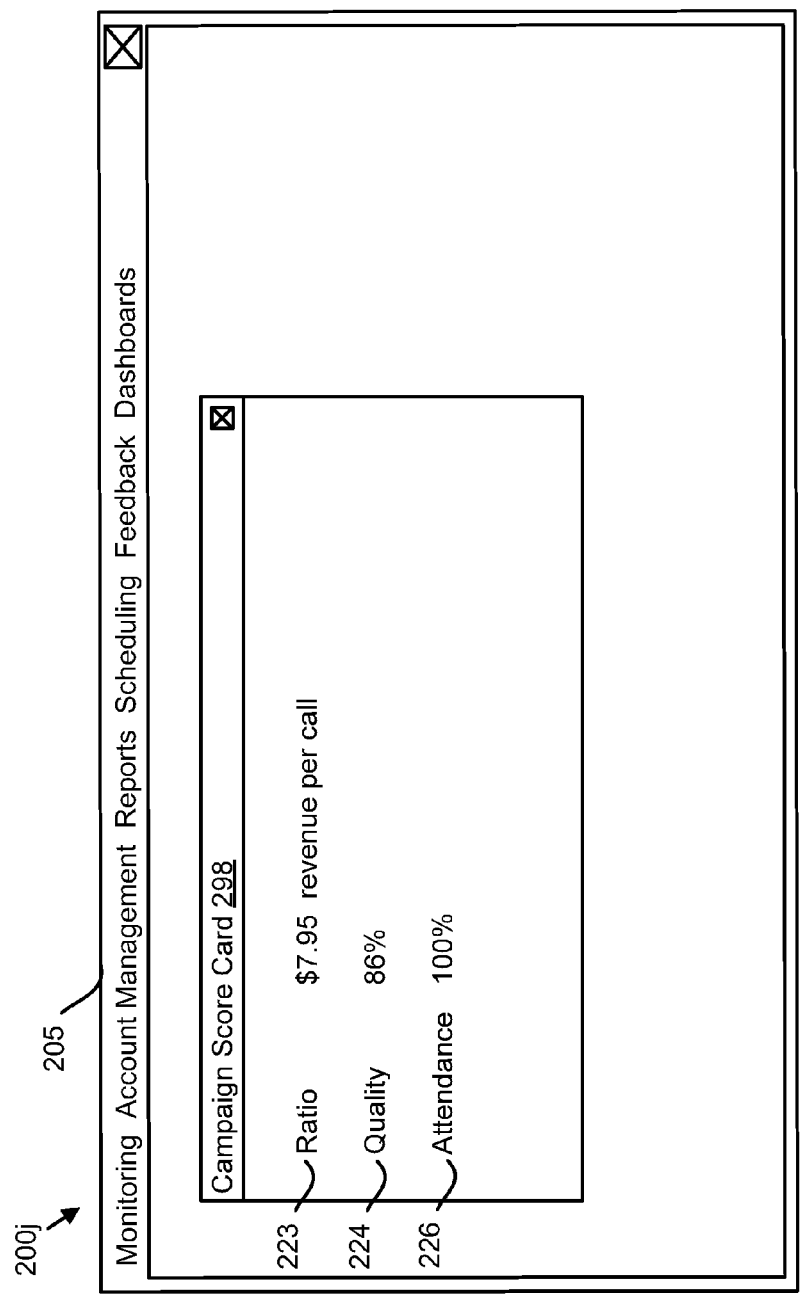
FIG. 20 is a drawing illustrating one embodiment of a dashboard with campaign score card metrics.

FIG. 20 is a drawing illustrating one embodiment of a dashboard 200j with campaign score card metrics 298. The campaign score card metrics 298 may include a ratio 223, a quality 224, and an attendance 226. The ratio 223 may be calculated from one or more metrics. In the depicted example, the ratio 223 is revenue per call. In one embodiment, the ratio 223 is multiplied by a constant. For example, a ratio 223 of revenue per hour may be multiplied by a constant 40 hours to yield revenue per workweek.

The quality 224 may indicate a quality of a call, the quality of monitored calls, or the like. The quality 224 may be expressed as a percentage, a grade, or the like. The attendance 226 may indicate a percentage of scheduled work times that a user attended.

Figure 21:
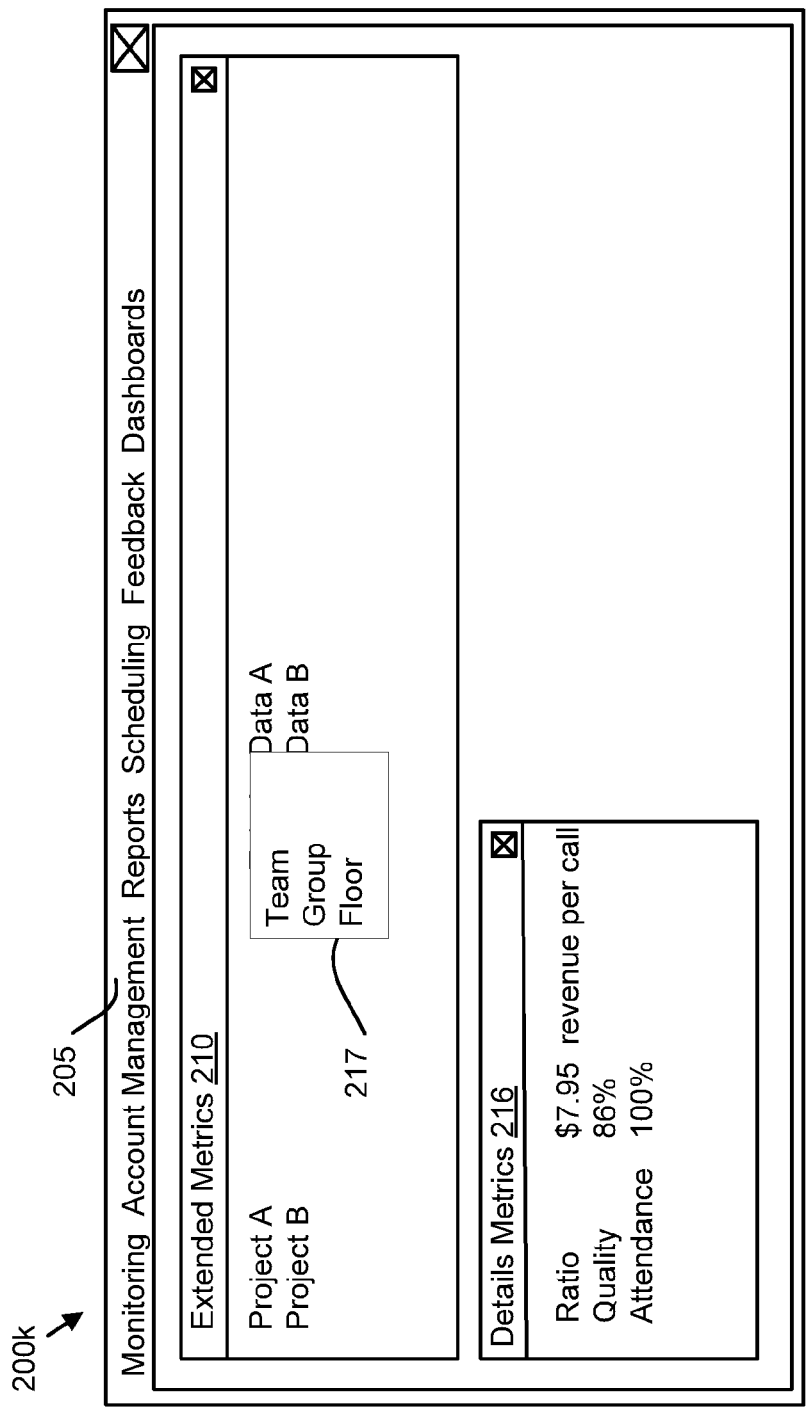
FIG. 21 is a drawing illustrating one alternative embodiment of a dashboard with selected detail.

FIG. 21 is a drawing illustrating one alternative embodiment of a dashboard 200k with selected detail. The dashboard 200k may be the dashboard 200a of FIG. 11. A detail selection box 217 is displayed in response to a selection action. The selection action may be right clicking an item such as project A. An administrator may select an option for viewing details from the detail selection box 217. For example, the administrator may select "Team" to view details by team. In response to the selection, the detailed metrics 216 may display metrics for the selection. In the depicted embodiment, the detailed metrics 216 for teams are displayed. If the administrator right clicks project A and selects "group," the detailed metrics 216 will be redrawn showing the metrics for groups.

Figure 22:
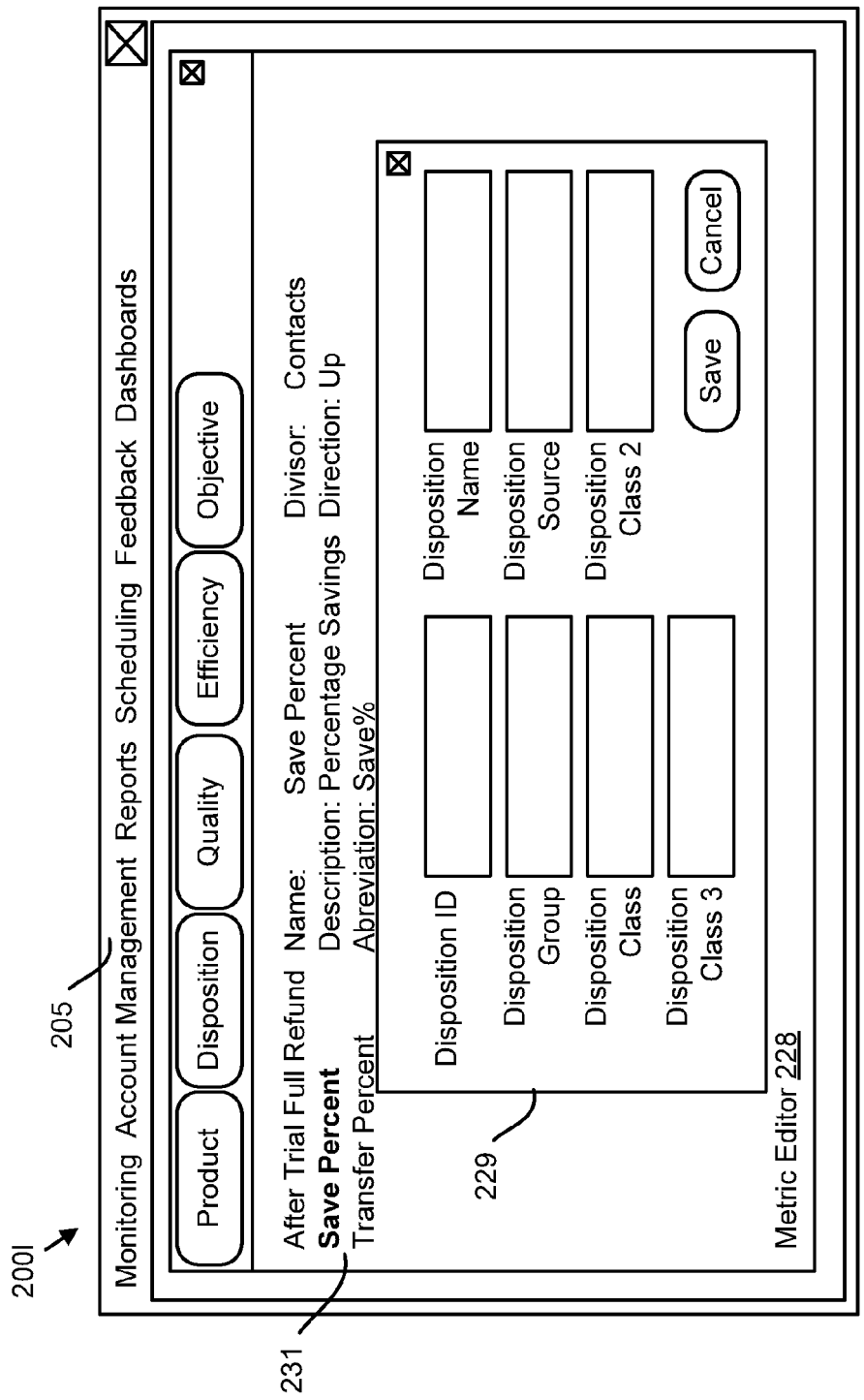
FIG. 22 is a drawing illustrating one embodiment of a dashboard with a metric editor.

FIG. 22 is a drawing illustrating one embodiment of a dashboard 2001 with a metric editor 228. The dashboard 2001 may be the dashboard 200a of FIG. 11. In one embodiment, the metrics and/or summary data is divided into a plurality of categories. In the depicted embodiment, the categories include product, disposition, quality, efficiency, and objective categories.

A metric editor 228 is depicted. The metric editor 228 may edit metrics, summary data, and the like, such as the summary data listed in Table 1. The metric editor 228 may display metric information 231. In addition, the metric editor 228 may provide an edit window 229. The edit window 229 may receive edits parameters metrics and/or summary data. Summary data and/or metrics may also be dynamically created in the edit window. In one embodiment, summary data may be defined as a mathematical, logical, statistical, random, probabilistic, string, simulation, or the like function of one or more other metrics and/or summary data.

In one embodiment, a product for sale by the user may be defined using the edit window 229. For example, the edit window 229 may define a high-speed Internet product. An introductory price, a discount price, a special incentive, and the like may be defined for the product.

Table 2 lists parameters for a metric and/or summary data that may be edited with the metric editor 228. Table 2 is exemplary only and not limiting.

TABLE 2

| Parameters | Description |
| --- | --- |
| ID | Identifier |
| Name | Display name |
| Group | Metric Group |
| Source | Source database |
| Class | Class of metric |
| Description | Detailed description. |
| Multiple by: | Multiple summary data by constant or other summary data |
| Divisor | Divide summary data by constant or other summary data |
| Function | Function for calculating metric |
| Direction | Direction of improvement |

INDUSTRIAL APPLICABILITY

Managing a call center requires close attention to the performance of user/agents and the effectiveness of scripts and training. Unfortunately, the information needed to make timely management decisions has been scattered across multiple sources. By collecting the call system data, the CRM data, the user data, and the scheduling data from various sources and organizing that data into the unified data base 425, the embodiments consolidate the information needed to evaluate and manage user performance in a call center.

The embodiments further support the customized calculation of summary data from the unified database 425. An administrator may establish custom metrics so that the needed information for a particular call center, customer, campaign, and/or groups of users is generated. Summary data is calculated from the original call system data, CRM data, user data, and scheduling data as it is collected and stored for timely access. As a result, the information needed to management call center is readily and rapidly available.

Administrators and users may customize presentation of the summary data so that metrics displayed are most useful and insightful to each administrator and user. The summary data is displayed as dashboard data in accordance with view parameters that are specified by the administrator and/or user. The summary data is viewable based on a variety of customizable hierarchies. In addition, a customized selection of summary data and/or metrics may be displayed in custom orders and using customized formats. As a result, the user and/or administrator receives the needed information quickly. Thus the administrator and/or user has rapid access to any needed summary data and/or metrics and can manage the call center more effectively by acting immediately on those to those metrics.

The embodiments further support the establishment of custom targets for any summary data, with notifications sent to administrators when performance comes within a specified range of deviating from the target. As a result, administrators receive early warning of a need to intervene. The administrator may also create custom bonuses tied to performance, with bonus results automatically calculated and displayed. Thus administrators can target incentives to greater effect.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of administering user incentives with call center data, the method comprising:
   receiving an objective option and an incentive function, the objective option and the incentive function received at an administrator dashboard presented at a display, wherein:
      the objective option defines at least one objective outcome associated with a predefined interaction between a customer and a user; and
      the incentive function defines at least one incentive earnable responsive to a predefined objective result;
   receiving, from a call center system associated with the administrator dashboard, monitoring data that is indicative of an interaction between a first customer and a first user over the call center system, the monitoring data comprising a user identifier, a customer identifier, a timestamp, and an interaction outcome;
   determining an objective result responsive to the objective option and the monitoring data;
   calculating an incentive responsive to the incentive function and the determined objective result; and
   crediting the first user with the calculated incentive.

2. The method of claim 1, further comprising communicating the calculated incentive and the user identifier to a payroll system.

3. The method of claim 1, further comprising creating a notification of the calculated incentive for the first user and providing the notification to a messaging system.

4. The method of claim 1, further comprising determining that the interaction outcome of the monitoring data meets the at least one objective outcome of the objective option.

5. The method of claim 1, wherein the at least one objective outcome comprises one or more of a conversion, a sale, and no change to an account.

6. The method of claim 5, wherein the sale comprises one or more of a sale of an item, sale of a service, upgrade of a service, and no return of a product.

7. The method of claim 1, wherein the at least one objective outcome comprises a metric threshold associated with the predefined interaction.

8. The method of claim 1, wherein the at least one objective outcome comprises an action associated with an occurrence of the predefined interaction.

9. The method of claim 1, further comprising determining a tier responsive to the determined objective result and a plurality of other objective results, and determining the incentive at least in part responsive to the determined tier.

10. A call center data processing system, the system comprising:
a call center system;
a dashboard presentable at a display and associated with the call center system; and
a data processing apparatus, comprising:
a communication interface configured to receive from the call center system monitoring data that is indicative of an interaction between a first customer and a first user over the call center system, the monitoring data comprising a user identifier, a customer identifier, a timestamp, and an interaction outcome;
one or more storage devices, comprising one or more databases configured to store the monitoring data;
a processor that, responsive to executing computer readable program code, is configured to:
determine an objective result responsive to an objective option and the monitoring data, wherein the objective option defines at least one objective outcome associated with a predefined interaction between a customer and a user;
calculate an incentive responsive to an incentive function and the objective result, the incentive function defining at least one incentive earnable responsive to the objective result; and
credit the first user with the calculated incentive.

11. The system of claim 10, further comprising a communication module configured to communicate the calculated incentive and the user identifier to a payroll system.

12. The system of claim 10, further comprising a communication module configured to provide a notification of the calculated incentive for the first user to a messaging system.

13. The system of claim 10, wherein the processor is configured to determine whether the interaction outcome of the monitoring data meets the at least one objective outcome of the objective option.

14. The method of claim 10, wherein the at least one objective outcome comprises one or more of a conversion, a sale, and no change to an account.

15. The method of claim 14, wherein the sale comprises one or more of a sale of an item, sale of a service, upgrade of a service, and no return of a product.

16. The method of claim 10, wherein the at least one objective outcome comprises one or more of a metric threshold associated with the predefined interaction and an action associated with an occurrence of the predefined interaction.

17. The method of claim 10, further comprising determining a tier responsive to the determined objective result and a plurality of other objective results, and determining the incentive responsive to the determined tier.

18. An administrative system for presenting call center data, the system comprising:
a display;
a processor configured to control display of a dashboard on the display, the dashboard comprising interactive regions, wherein the interactive regions comprise:
a first region configured to receive a first selection corresponding to an objective option that defines at least one objective outcome associated with an interaction between a customer and a user over a call center system;
a second region configured to receive a second selection corresponding to an incentive function; and
a third region configured to receive a third selection corresponding to a user identifier,
wherein the administrative system is configured to associate and store the first selection, the second selection, and the third selection responsive to activation of one or more of the interactive regions.

19. The administrative system of claim 18, wherein the interactive regions are one or more of a menu, field, or a radio button.

20. The administrative system of claim 18, wherein the interactive regions further comprise a fourth region configured to display the objective option, the incentive function, and the user identifier as dashboard data.

* * * * *

UNITED STATES PATENT AND TRADEMARK OFFICE
CERTIFICATE OF CORRECTION

PATENT NO. : 9,967,398 B2
APPLICATION NO. : 14/425559
DATED : May 8, 2018
INVENTOR(S) : John Porter, Bill Wiser and Ben Johnson It is certified that error appears in the above-identified patent and that said Letters Patent is hereby corrected as shown below:

In the Specification
    Column 12, Line 67, change ""RPI" is calculated" to --"RPH" is calculated--

In the Claims
Claim 10, Column 19, Line 38, change "to the objective result" to --to an objective result--

Signed and Sealed this
Twenty-sixth Day of June, 2018

Andrei Iancu
*Director of the United States Patent and Trademark Office*